(12) United States Patent
Schröder et al.

(10) Patent No.: US 12,326,090 B2
(45) Date of Patent: Jun. 10, 2025

(54) ROTOR AND TURBOMACHINE COMPRISING THE ROTOR

(71) Applicant: Siemens Energy Global GmbH & Co. KG, Bayern (DE)

(72) Inventors: Peter Schröder, Essen (DE); Dirk Springborn, Berlin (DE); Karsten Kolk, Mülheim a.d. Ruhr (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 18/682,900

(22) PCT Filed: Aug. 24, 2022

(86) PCT No.: PCT/EP2022/073534
§ 371 (c)(1),
(2) Date: Feb. 10, 2024

(87) PCT Pub. No.: WO2023/025827
PCT Pub. Date: Mar. 2, 2023

(65) Prior Publication Data
US 2024/0368995 A1    Nov. 7, 2024

(30) Foreign Application Priority Data

Aug. 24, 2021    (EP) .................................... 21192696

(51) Int. Cl.
*F01D 5/30*      (2006.01)
*F01D 5/02*      (2006.01)
*F01D 11/08*     (2006.01)

(52) U.S. Cl.
CPC ............... *F01D 11/08* (2013.01); *F01D 5/02* (2013.01); *F05D 2240/55* (2013.01)

(58) Field of Classification Search
CPC . F01D 5/30; F01D 5/3015; F01D 5/32; F01D 5/323; F01D 5/3007; F01D 11/006; F05D 2240/55
See application file for complete search history.

(56) References Cited

U.S. PATENT DOCUMENTS 9,303,767 B2    4/2016  Watanabe
2005/0265849 A1* 12/2005  Bobo ................... F01D 11/006
                                                416/220 R (Continued)

FOREIGN PATENT DOCUMENTS

DE    102010063594 A1    6/2012
DE    102018218942 A1    5/2020

(Continued)

OTHER PUBLICATIONS

PCT International Search Report and Written Opinion of International Searching Authority mailed Oct. 21, 2022 corresponding to PCT International Application No. PCT/EP2022/073534 filed Aug. 24, 2022.

*Primary Examiner* — David E Sosnowski
*Assistant Examiner* — Maxime M Adjagbe
(74) *Attorney, Agent, or Firm* — Wolter Van Dyke Davis, PLLC

(57) ABSTRACT

A sealing ring for a turbomachine, having at least a first and a second segment. The first segment has, in a region of a first longitudinal end, a first recess and a first projection having a first flank which delimits the first recess. The second segment has, in a region of a second longitudinal end, a second recess and a second projection having a first flank which flank delimits the second recess. The first and second segments have a coupling state in which they are movable relative to one another. The first projection is arranged in the second recess, the second projection is arranged in the first recess, and the first flank of the first projection and the first (Continued)

flank of the second projection are designed to abut one another upon a first movement of the first segment away from the second segment and to limit the first movement.

16 Claims, 4 Drawing Sheets

(56) References Cited

U.S. PATENT DOCUMENTS

| | | |
|---|---|---|
| 2008/0260521 A1 | 10/2008 | Werro |
| 2012/0034087 A1 | 2/2012 | Dungs |
| 2013/0202433 A1* | 8/2013 | Hafner .................. F01D 11/008 415/230 |
| 2017/0159440 A1* | 6/2017 | Willett, Jr. ............ F01D 5/3015 |
| 2019/0277146 A1* | 9/2019 | Murata ..................... F01D 5/30 |

FOREIGN PATENT DOCUMENTS

| | | |
|---|---|---|
| EP | 1947373 A1 | 7/2008 |
| FR | 2985763 A1 | 7/2013 |

* cited by examiner

ROTOR AND TURBOMACHINE COMPRISING THE ROTOR

CROSS REFERENCE TO RELATED APPLICATIONS

This application is the US National Stage of International Application No. PCT/EP2022/073534 filed 24 Aug. 2022, and claims the benefit thereof, which is incorporated by reference herein in its entirety. The International Application claims the benefit of European Application No. EP21192696 filed 24 Aug. 2021.

FIELD OF INVENTION

The invention related to a sealing ring for a turbomachine.

BACKGROUND OF INVENTION

In a turbomachine, such as a gas turbine or a steam turbine, cooling air is conventionally blown in to cool components of the turbomachine that are subject to high thermal stress. The highly stressed components can be, for example, a combustion chamber, rotor blades and/or guide vanes, in particular the rotor blades and/or guide vanes in the first stage downstream of the combustion chamber. In addition, sealing air is conventionally blown into the turbomachine in order to seal leaks in a flow channel of the turbomachine. The leaks can occur, for example, between the air vanes and a housing of the turbomachine and/or between the guide vanes and a rotor of the turbomachine.

In addition, leaks can also occur in an air-cooled rotor of a gas turbine. For example, DE 10 2018 218 942 A1 discloses a rotor of the same type with a seal for the gap between the platform and the cover element, in which a T-shaped sealing ring seals said gap.

Unwanted leaks in the cooling air and/or the sealing air lead to a reduction in the efficiency of the turbomachine. To seal the leakages, segmented sealing rings can be used, for example, which have a plurality of segments that can move relative to one another. This allows the segmented sealing rings to adapt to changing cross-sections of the turbomachine caused by heating and/or cooling of the turbomachine. The problem here is that leaks can form in the region where two segments abut one another, which in turn can lead to a reduction in the efficiency of the turbomachine. For example, it is known from EP 1 944 471 A1 that the cover element does not have to be a one-piece, ring-shaped element, but can be formed from a large number of plate-shaped sealing elements that can be individually attached to a turbine disk.

SUMMARY OF INVENTION

An object of the invention is therefore to create a rotor and a turbomachine comprising the rotor, wherein a turbomachine with a high degree of efficiency can be achieved with the sealing ring.

The rotor according to the invention for a turbomachine comprises a rotor disk which has a plurality of rotor blades arranged in a ring circumferentially, wherein the rotor blades comprise a blade platform with a platform overhang, the underside of which faces an end face of the rotor disk, wherein a cover ring is arranged radially on the end face of the rotor disk and inside the underside with a receiving groove which opens radially outward and extends in the circumferential direction and in which a sealing ring is arranged for sealing a radial gap between the underside and the cover ring, wherein the sealing ring comprises at least a first segment and a second segment, which each have a first longitudinal end with respect to a circumferential direction of the sealing ring and a second longitudinal end with respect to the circumferential direction, wherein the first segment has, in a region of the first longitudinal end, a first recess and a first projection with a first flank of the first projection delimiting the first recess in the circumferential direction, and the second segment has, in a region of the second longitudinal end, a second recess and a second projection with a first flank of the second projection delimiting the second recess in the circumferential direction, wherein the first segment and the second segment have a coupling state, in which the first segment and the second segment can be displaced relative to one another in the circumferential direction and the first projection is arranged in the second recess, the second projection is arranged in the first recess and the first flank of the first projection and the first flank of the second projection are designed, upon a first displacement of the first segment away from the second segment, to abut one another and thus to limit the first displacement.

A leakage flow that passes the sealing ring in an axial direction with respect to the sealing ring must flow in the circumferential direction, and in so doing must flow around both the first projection and the second projection. As a result, the leakage flow experiences a high flow resistance, which means that the mass flow of the leakage flow is low. This enables a high degree of efficiency to be achieved for the turbomachine.

It is preferred that the first recess in the circumferential direction is longer than the second projection in the circumferential direction and the second recess in the circumferential direction is longer than the first projection in the circumferential direction. It can thus advantageously be achieved that the first segment and the second segment are displaceable relative to one another in the circumferential direction.

It is preferred that the first recess has an end face of the first recess and the second projection has an end face of the second projection, wherein the end face of the first recess delimits it in an axial direction with respect to the sealing ring, the end face of the second projection delimits it in the axial direction, wherein in the coupling state the end face of the first recess and the end face of the second projection are arranged facing one another and delimit a first sealing gap. It is also preferred that the second recess has an end face of the second recess and the first projection has an end face of the first projection, wherein the end face of the second recess delimits it in an axial direction with respect to the sealing ring, the end face of the first projection delimits it in the axial direction, wherein in the coupling state the end face of the second recess and the end face of the first projection are arranged facing one another and delimit a second sealing gap. By providing the first sealing gap and/or the second sealing gap, the flow resistance can be further increased and thus the efficiency of the turbomachine can be increased.

The first segment preferably has a first recess flank which delimits the first recess in the circumferential direction, and the second projection preferably has a second flank of the second projection, wherein in the coupling state the first recess flank and the second flank of the second projection are designed, upon a second displacement of the first segment toward the second segment, to abut one another and thus to limit the second displacement.

It is particularly preferred that the second flank of the second projection and the second longitudinal end coincide.

The second segment preferably has a recess radial delimitation, which delimits the second recess in a radial direction with respect to the sealing ring, wherein in the coupling state the first projection and the recess radial delimitation delimit a third sealing gap. By providing the third sealing gap, the flow resistance can be further increased.

It is preferred that the second segment has a circumferential projection protruding in the direction of the remaining second segment and the first segment has a receptacle in which the circumferential projection is arranged in the coupling state.

The sealing ring preferably has a T-shaped profile.

It is preferable that all the segments have the same design.

It is preferred that all the segments each have, in the region of the first longitudinal end, the first recess and the first projection with the first flank of the first projection delimiting the first recess and, in the region of the second longitudinal end, the second recess and the second projection with the first flank of the second projection delimiting the second recess, wherein the sealing ring has an assembly state in which all pairs of those segments which are arranged adjacent in the sealing direction are arranged in the coupling state.

The turbomachine according to the invention has the sealing ring. The sealing ring is preferably designed to seal a cooling air and/or a sealing air in the turbomachine. The turbomachine can be a steam turbine or a gas turbine, for example. The sealing ring can be arranged in a compressor portion of the gas turbine and/or a turbine portion of the gas turbine.

BRIEF DESCRIPTION OF THE DRAWINGS

The invention will be explained in more detail below, with reference to the appended schematic drawings. In the figures

DETAILED DESCRIPTION OF INVENTION

Figure 1:
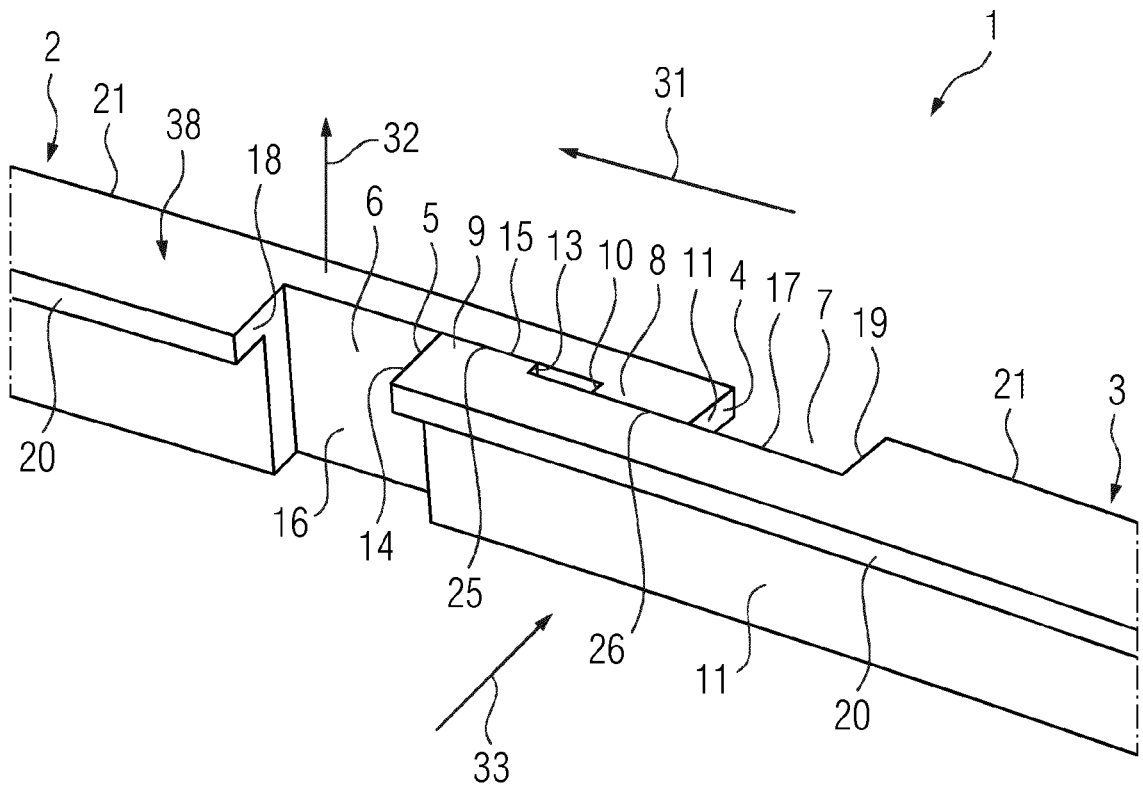
FIG. 1 is a perspective view of a first embodiment of the sealing ring.
Figure 2:
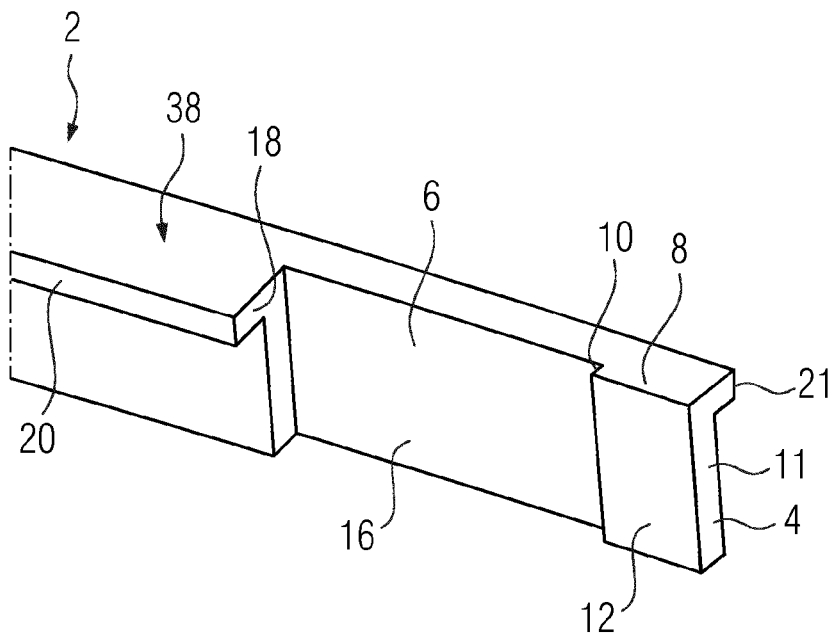
FIG. 2 is a perspective view of a first segment of the first embodiment.
Figure 3:
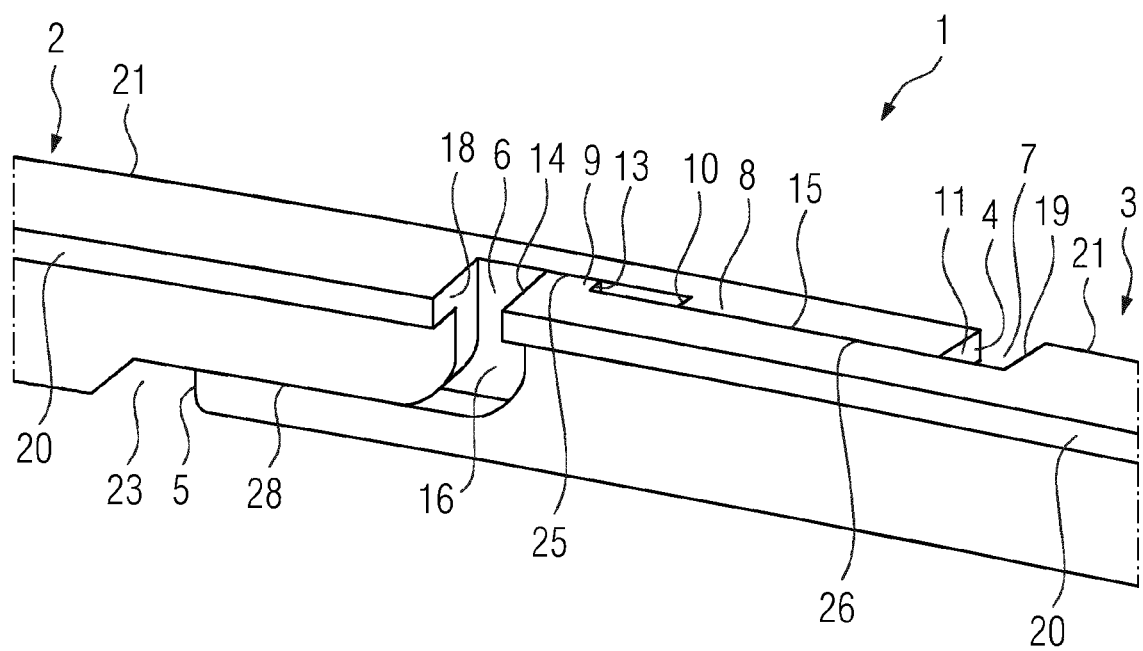
FIG. 3 is a perspective view of a second embodiment of the sealing ring.
Figure 4:
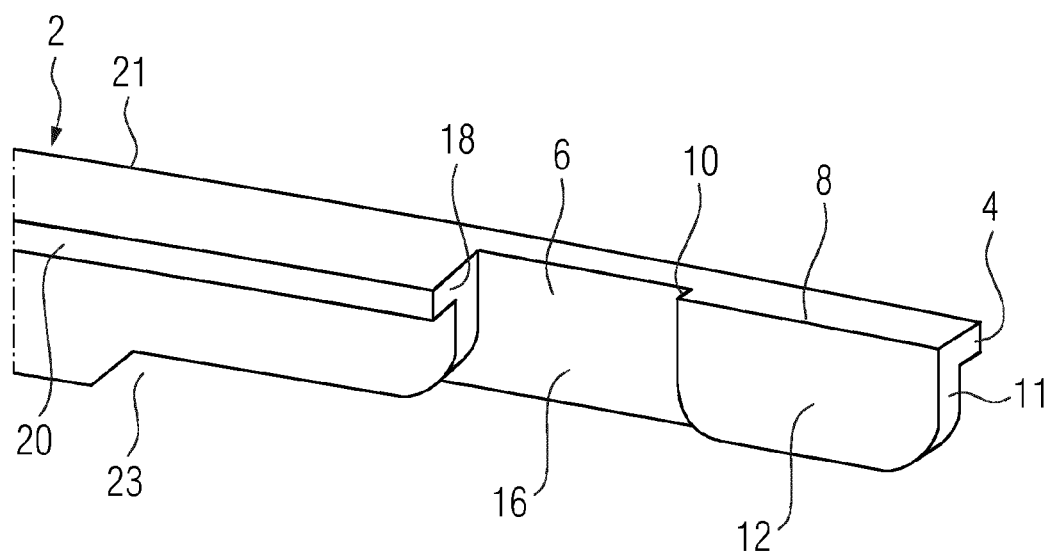
FIG. 4 is a perspective view of a first segment of the second embodiment.

As can be seen from FIGS. 1 to 6, a sealing ring 1 for a turbomachine has at least a first segment 2 and a second segment 3. The first segment 2 and the second segment 3 each have a first longitudinal end 4 with respect to a circumferential direction 31 (see FIG. 1) of the sealing ring 1 and a second longitudinal end 5 with respect to the circumferential direction 31. In a region of the first longitudinal end 4, the first segment 2 has a first recess 6 and a first projection 8 with a first flank 10 of the first projection 8 delimiting the first recess 6 in the circumferential direction 31. In a region of the second longitudinal end 5, the second segment 3 has a second recess 7 and a second projection 9 with a first flank 13 of the second projection 8, said first flank delimiting the second recess 7 in the circumferential direction 31. The first segment 2 and the second segment 3 have a coupling state, which is shown in FIGS. 1 and 3 and in which the first segment 2 and the second segment 3 can be displaced relative to one another in the circumferential direction 31 and the first projection 8 is arranged in the second recess 7, the second projection 9 is arranged in the first recess 6 and the first flank 10 of the first projection 8 and the first flank 13 of the second projection 9 are designed, when the first segment 2 is displaced away from the second segment 3 for the first time, to abut one another and thus to limit the first displacement.

The region of the first longitudinal end 4 can, for example, extend from the first longitudinal end 4 in the circumferential direction 31 up to 50%, in particular 25% or 15%, of a total length of the respective segment 2, 3 in the circumferential direction 31 to the second longitudinal end 5 of the respective segment 2, 3. The first recess 6 can, for example, be arranged completely in the region of the first longitudinal end 4. The region of the second longitudinal end 5 can, for example, extend from the second longitudinal end 5 in the circumferential direction 31 up to 50%, in particular 25% or 15%, of a total length of the respective segment 2, 3 in the circumferential direction 31 to the first longitudinal end 5 of the respective segment 2, 3. The second recess 7 can, for example, be arranged completely in the region of the second longitudinal end 5.

All the segments 2, 3 can each have the first recess 6 and the first projection 8 with the first flank 10 of the first projection 8 delimiting the first recess 6 in the region of the first longitudinal end 4 and can have the second recess 7 and the second projection 9 with the first flank 13 of the second projection 8 delimiting the second recess 7 in the region of the second longitudinal end 5. The sealing ring 1 can have an assembly state here, in which all pairs of those segments 2, 3 which are arranged adjacent in the sealing direction 1 are arranged in the coupling state. All the segments 2, 3 can be of identical design here. The circumferential direction 31 with respect to the sealing ring 1, radial direction 32 with respect to the sealing ring 1 and axial direction 33 with respect to the sealing ring 1 shown in FIG. 1 can refer here to the sealing ring 1 in its assembly state.

FIGS. 1 and 3 show that the first recess 6 in the circumferential direction 31 can be longer than the second projection 9 in the circumferential direction 31 and the second recess 7 in the circumferential direction 31 can be longer than the first projection 8 in the circumferential direction 31. In particular, a minimum extent of the first recess 6 in the circumferential direction 31 can be longer than a maximum extent of the second projection 9 in the circumferential direction and, in particular, a minimum extent of the second recess 7 in the circumferential direction 31 can be longer than a maximum extent of the first projection 8 in the circumferential direction 31.

As can be seen from FIGS. 1 and 3, the first recess 6 can have an end face 16 (see FIGS. 2 and 4) of the first recess 6 and the second projection 9 can have an end face 15 (see FIG. 5) of the second projection 9, wherein the end face 16 of the first recess 6 delimits it in the axial direction 33 with respect to the sealing ring 1, the end face 15 of the second projection 9 delimits it in the axial direction 33, wherein in the coupling state the end face 16 of the first recess 6 and the end face 15 of the second projection 9 are arranged facing one another and delimit a first sealing gap 25. In addition, the second recess 7 can have an end face 17 (see FIG. 5) of the second recess 7 and the first projection 8 can have an end face 12 (see FIGS. 2 and 4) of the first projection 8, wherein the end face 17 of the second recess 7 delimits it in the axial direction 33 with respect to the sealing ring 1, the end face 12 of the first projection 8 delimits it in the axial direction 33, wherein in the coupling state the end face 17 of the second recess 7 and the end face 12 of the first projection 8 are arranged facing one another and delimit a second scaling gap 26.

As can be seen from FIGS. 1 to 5, the sealing ring 1 can have a T-shaped profile. For this purpose, the first segment 2 and the second segment 3 can have a first overhang 20, which is arranged on the outside in the radial direction 32 (see the figures) or on the inside in the radial direction 32 on the first segment 2 and the second segment 3 and projects from the remaining segment 2, 3 in the axial direction 33. In addition, the first segment 2 and the second segment 3 can have a second overhang 21, which is arranged on the outside in the radial direction 32 (see the figures) or on the inside in the radial direction 32 on the first segment 2 and the second segment 3 and projects from the remaining segment 2, 3 in the axial direction 33 and protrudes on a side facing away from the first overhang 20.

FIGS. 1 to 5 show that the first segment 2 can have a first recess flank 18, which delimits the first recess 6 in the circumferential direction 31, and the second projection 9 can have a second flank 14 of the second projection 9, wherein in the coupling state the first recess flank 18 and the second flank 14 of the second projection 9 are designed, upon a second displacement of the first segment 2 toward the second segment 3, to abut one another and thus to limit the second displacement. The first recess flank 18 can be arranged facing the first flank 10 of the first projection 8. In addition, the second segment 3 can have a second recess flank 19, which delimits the second recess 7 in the circumferential direction 31 and is arranged facing the first flank 13 of the second projection 9.

FIGS. 1 and 2 show that, according to a first embodiment of the sealing ring 1, the second flank 14 of the second projection 9 and the second longitudinal end 5 can coincide.

Figure 5:
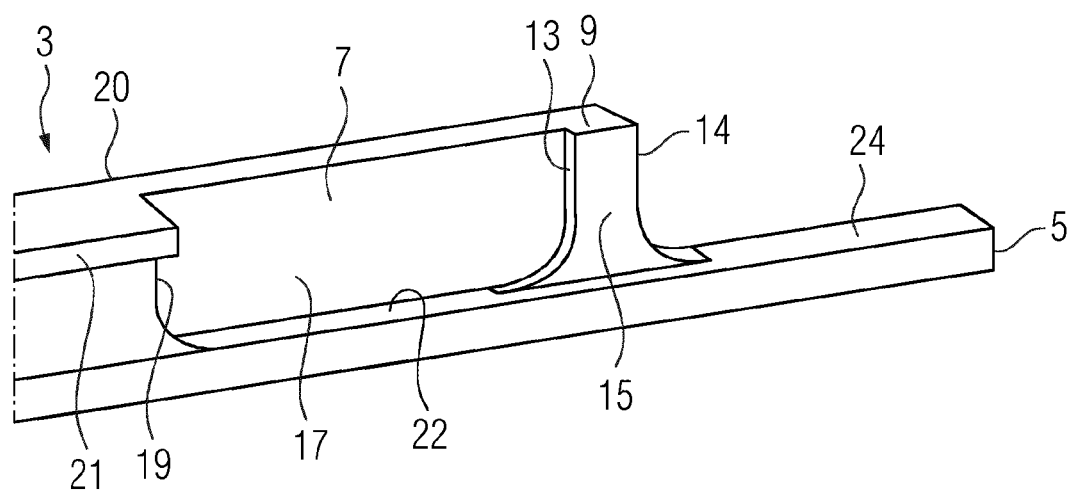
FIG. 5 is a perspective view of a second segment of the second embodiment and FIG. 6 shows the sealing arrangement with the sealing ring in longitudinal section with rotor disk, cover ring and rotor blade.

FIG. 5 shows that, according to a second embodiment of the sealing ring 1, the second segment 2 can have a recess radial delimitation 22 which delimits the second recess 7 in a radial direction 32 with respect to the sealing ring 1, wherein in the coupling state the first projection 8 and the recess radial delimitation 22 delimit a third sealing gap. In addition, according to the second embodiment (see FIGS. 3 to 5), the second segment 3 can have a circumferential projection 24 protruding in the direction of the remaining second segment 4 and the first segment 2 can have a receptacle 23 in which the circumferential projection 24 is arranged in the coupling state. It is also conceivable that the circumferential projection 24 is arranged in alignment with the recess radial delimitation 22 in the circumferential direction 31, see FIG. 5.

Figure 6:
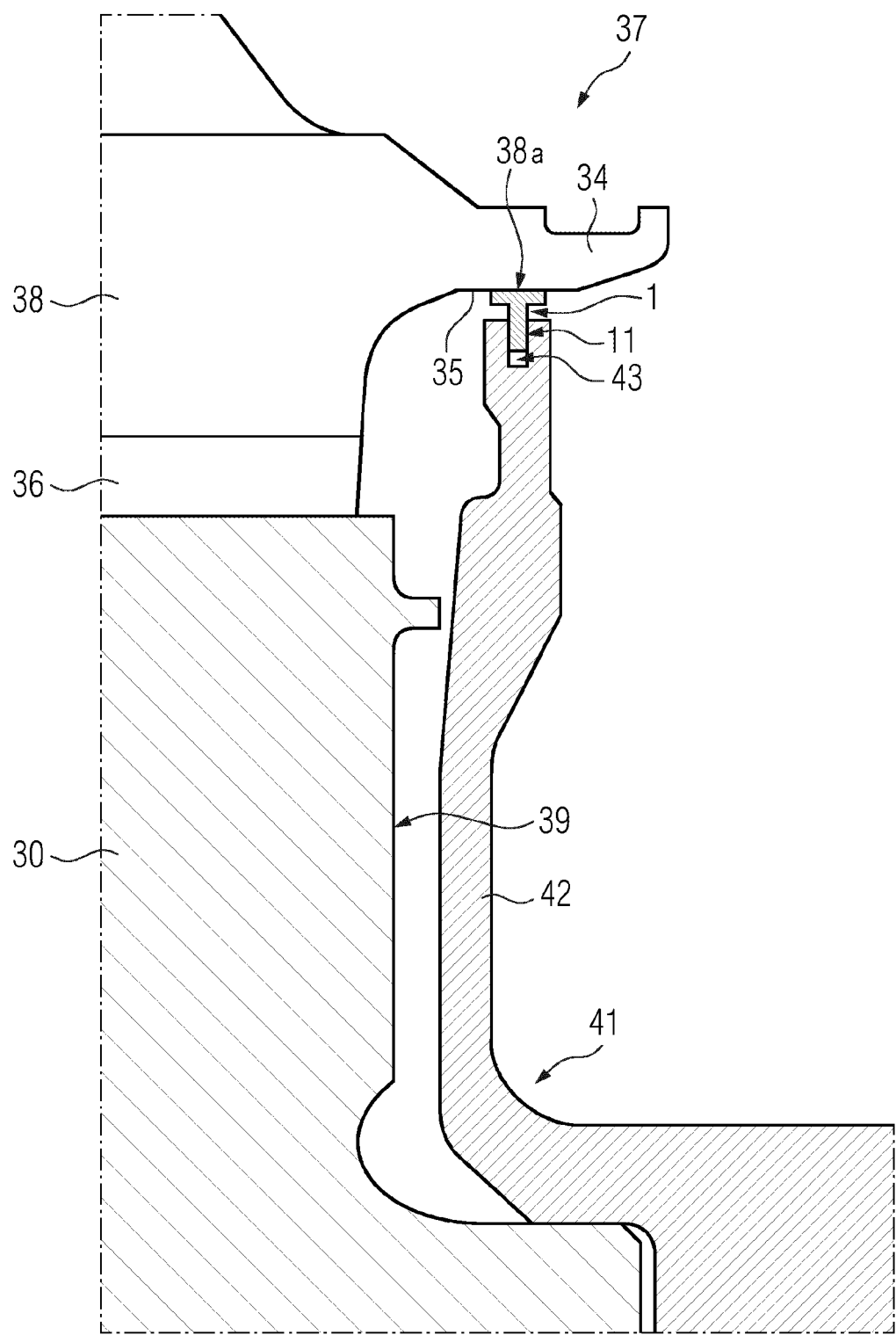

FIG. 6 shows a sketch of an exemplary embodiment of a rotor according to the invention in longitudinal section. Only a detail of the region of a sealing arrangement is shown here, wherein the design of the rotor is well known to a person skilled in the art and requires no further explanation.

The rotor disk 30 can be seen in portions, which rotor disk 30 has a plurality of blade retaining grooves distributed along its circumference. A rotor blade 37 with a blade root 36 is arranged in each of the blade retaining grooves. The rotor blades, which are then arranged in a radial pattern, form a blade ring. As usual, the blade root 36 is adjoined by the blade platform 38, which extends in the circumferential direction and axially. The blade platform 38 projects here beyond an end face 39 of the rotor disk 30 with a platform overhang 34 and has an underside 35 here.

A rotor component 41 is located adjacent to the rotor disk 30 on the end face, which rotor component 41 integrally forms the cover ring 42 according to this exemplary embodiment, which cover ring 42 extends substantially in the circumferential direction and radially. Apart from thermal and/or centrifugal-force-induced expansions, no relative displacements or even relative movements occur between the rotor disk 30 and the rotor component. They are—in relation to one another—to be regarded as static components, even though the rotor is rotatably mounted as a whole in the known manner. As an alternative to the integral design shown, the cover ring can also have a modular design and thus can comprise a large number of sealing plates distributed along the circumference, which are held on the end face of the rotor disk 30.

The cover ring 42 has a receiving groove 43 that opens radially outward and extends in the circumferential direction. The segmented sealing ring 1 described above is mounted in this receiving groove 43. The substantially T-shaped profile of the sealing ring 1 can be seen. The sealing ring 1 comprises a bearing portion 11 (FIG. 2), arranged in the receiving groove 43, as well as a contact portion 38a on the radially outward-facing side. The contact portion 38a comes into contact with the underside 35 of the platform overhang 34, at least when the rotor rotates, and thus seals the design-induced radial gap between the underside 35 and the cover ring 42 in order to reduce or even prevent the flow of cooling air or sealing air through the radial gap.

The invention claimed is:
1. A rotor for a turbomachine, comprising:
a rotor disk, which has a plurality of rotor blades arranged in a ring circumferentially,
wherein each of the plurality of rotor blades comprise a blade platform with a platform overhang, an underside of which overhang faces an end face of the rotor disk,
wherein a cover ring is arranged on the end face of the rotor disk and radially inside the underside, with a receiving groove opening radially outward and extending in a circumferential direction, in which receiving groove a sealing ring is arranged for sealing a radial gap between the underside and the cover ring,
wherein the sealing ring comprises at least a first segment and a second segment, which each have a first longitudinal end with respect to a circumferential direction of the sealing ring and a second longitudinal end with respect to the circumferential direction,
wherein the first segment has, in a region of the first longitudinal end, a first recess and a first projection with a first flank of the first projection delimiting the first recess in the circumferential direction and the second segment has, in a region of the second longitudinal end, a second recess and a second projection with a first flank of the second projection delimiting the second recess in the circumferential direction, and
wherein the first segment and the second segment have a coupling state in which the first segment and the second segment can be displaced relative to one another in the circumferential direction and the first projection is arranged in the second recess, the second projection is arranged in the first recess and the first flank of the first projection and the first flank of the second projection are designed, when the first segment is displaced away from the second segment, to abut one another for the first time and thus to limit a first displacement.

2. The rotor as claimed in claim 1,
wherein the first recess in the circumferential direction is longer than the second projection in the circumferential direction and the second recess in the circumferential direction is longer than the first projection in the circumferential direction.

3. The rotor as claimed in claim 1,
wherein the first recess has an end face of the first recess and the second projection has an end face of the second projection,
wherein the end face of the first recess delimits the first recess in an axial direction with respect to the sealing ring, the end face of the second projection delimits it the second projection in the axial direction,
wherein in the coupling state the end face of the first recess and the end face of the second projection are arranged facing one another and delimit a first sealing gap.

4. The rotor as claimed in claim 1,
wherein the second recess has an end face of the second recess and the first projection has an end face of the first projection,
wherein the end face of the second recess delimits the second recess in an axial direction with respect to the sealing ring, the end face of the first projection delimits the first projection in the axial direction,
wherein in the coupling state the end face of the second recess and the end face of the first projection are arranged facing one another and delimit a second sealing gap.

5. The rotor as claimed in claim 1,
wherein the first segment has a first recess flank, which delimits the first recess in the circumferential direction, and the second projection has a second flank of the second projection,
wherein in the coupling state the first recess flank and the second flank of the second projection are designed, upon a second displacement of the first segment toward the second segment, to abut one another and thus to limit the second displacement.

6. The rotor as claimed in claim 5,
wherein the second flank of the second projection and the second longitudinal end coincide.

7. The rotor as claimed in claim 1,
wherein the second segment has a recess radial delimitation comprising a radially outward facing surface, which radially outward facing surface delimits the second recess in a radial direction with respect to the sealing ring,
wherein in the coupling state the first projection and the recess radial delimitation delimit a third sealing gap.

8. The rotor as claimed in claim 1,
wherein the second segment has a circumferential projection protruding in the circumferential direction and the first segment has a receptacle in which the circumferential projection is arranged in the coupling state.

9. The rotor as claimed in claim 1,
wherein the sealing ring has a T-shaped profile.

10. The rotor as claimed in claim 1,
wherein all the segments are identical.

11. The rotor as claimed in claim 1,
wherein all segments each have, in the region of the first longitudinal end, the first recess and the first projection with the first flank of the first projection delimiting the first recess and, in the region of the second longitudinal end, the second recess and the second projection with the first flank of the second projection delimiting the second recess,
wherein the sealing ring has an assembly state in which all pairs comprising the first segment and the second segment which are arranged adjacent in the circumferential direction are arranged in the coupling state.

12. A turbomachine, comprising:
the rotor as claimed in claim 1.

13. The turbomachine as claimed in claim 12,
wherein the sealing ring is designed to seal a cooling air and/or a sealing air in the turbomachine.

14. The rotor as claimed in claim 1,
wherein the first segment and the second segment are formed by respective separate bodies; and
wherein the sealing ring is a composite sealing ring comprising the first segment and the second segment.

15. The rotor as claimed in claim 1,
wherein the at least a first segment and a second segment comprises a plurality of the first segments and a plurality of the second segments;
wherein in an assembly state the sealing ring comprises a plurality of pairs arranged end to end circumferentially, wherein each pair comprises a respective first segment of the plurality of first segments and a respective second segment of the plurality of second segments.

16. The rotor as claimed in claim 1,
wherein in an assembly state the sealing ring is free of an internal resilience that biases the sealing ring radially outward onto the underside of the overhang.

* * * * *